(12) United States Patent
Kawahara et al.

(10) Patent No.: US 10,654,746 B2
(45) Date of Patent: May 19, 2020

(54) GLASS PLATE WITH ANTIREFLECTION FILM

(71) Applicant: AGC Inc., Chiyoda-ku (JP)

(72) Inventors: Hirotomo Kawahara, Tokyo (JP); Kenichi Suzuki, Tokyo (JP); Nobutaka Aomine, Tokyo (JP)

(73) Assignee: AGC Inc., Chiyoda-ku (JP)

( * ) Notice: Subject to any disclaimer, the term of this patent is extended or adjusted under 35 U.S.C. 154(b) by 125 days.

(21) Appl. No.: 15/986,990

(22) Filed: May 23, 2018

(65) Prior Publication Data

US 2018/0265403 A1    Sep. 20, 2018

Related U.S. Application Data

(63) Continuation of application No. PCT/JP2016/085428, filed on Nov. 29, 2016.

(30) Foreign Application Priority Data

Dec. 3, 2015 (JP) .................................. 2015-236620

(51) Int. Cl.
*C03C 17/34* (2006.01)
*G02B 1/115* (2015.01)
(Continued)

(52) U.S. Cl.
CPC .......... *C03C 17/3417* (2013.01); *B32B 7/023* (2019.01); *G02B 1/115* (2013.01);
(Continued)

(58) Field of Classification Search
CPC .......... G02B 1/11–1/118; C03C 17/00–17/44; B32B 7/00–7/14; B32B 17/10201; B32B 17/10036; B32B 17/1055
See application file for complete search history.

(56) References Cited

U.S. PATENT DOCUMENTS 4,726,654 A * 2/1988 Kimura .................. G02B 1/115
359/588
5,318,830 A * 6/1994 Takamatsu ........ B32B 17/10036
428/216
(Continued)

FOREIGN PATENT DOCUMENTS

EP    3 085 673 A1    10/2016
JP    05-264804    10/1993
(Continued)

OTHER PUBLICATIONS

Dobrowolski, J.A. (eds. Bass et al.). "Optical Properties of Films and Coatings", Handbook of Optics, vol. I: Fundamentals, Techniques, and Design, (1995); pp. 42.3-42.130.*
(Continued)

*Primary Examiner* — Prashant J Khatri
(74) *Attorney, Agent, or Firm* — Oblon, McClelland, Maier & Neustadt, L.L.P.

(57) ABSTRACT

Provided is a glass sheet with an antireflection film: containing a glass sheet, a first transparent high refractive index layer located on the glass sheet, a first transparent low refractive index layer located on the first transparent high refractive index layer, a second transparent high refractive index layer located on the first transparent low refractive index layer, and a second transparent low refractive index layer located on the second transparent high refractive index layer; having a haze after heating at 600° C. to 700° C. for 15 minutes being 0.4% or less; and having a visible light reflectance measured from the side of the second transparent low refractive index layer based on JIS R 3106 being 1.0% or less.

19 Claims, 3 Drawing Sheets

(51) Int. Cl.
  *B32B 7/023* (2019.01)
  *B32B 17/10* (2006.01)
(52) U.S. Cl.
  CPC ..... *B32B 17/10036* (2013.01); *B32B 17/1055* (2013.01); *B32B 17/10201* (2013.01); *C03C 2217/734* (2013.01); *C03C 2218/155* (2013.01); *C03C 2218/365* (2013.01)

(56) References Cited

U.S. PATENT DOCUMENTS

| | | |
|---|---|---|
| 5,578,536 A | 11/1996 | Kameyama et al. |
| 2006/0165963 A1 | 7/2006 | Fleury et al. |
| 2007/0279750 A1 | 12/2007 | Yaoita et al. |
| 2009/0047509 A1 | 2/2009 | Gagliardi et al. |
| 2013/0183489 A1 | 7/2013 | Cremer et al. |
| 2015/0103399 A1 | 4/2015 | Hanekawa et al. |
| 2016/0257611 A1 | 9/2016 | Noethe et al. |
| 2017/0036948 A1 | 2/2017 | Hanekawa et al. |

FOREIGN PATENT DOCUMENTS

| | | |
|---|---|---|
| JP | 2005-531814 | 10/2005 |
| WO | WO 2006/080502 A1 | 8/2006 |
| WO | 2009-531262 | 9/2009 |
| WO | WO 2013/176132 A | 11/2013 |
| WO | WO 2015/052494 A1 | 4/2015 |
| WO | WO 2015/093322 A1 | 6/2015 |
| WO | WO 2015/163331 A1 | 10/2015 |
| WO | WO 2016/167127 A1 | 10/2016 |

OTHER PUBLICATIONS

Extended European Search Report dated Jul. 23, 2019 in corresponding European Patent Application No. 16870662.0, 8 pages.
International Search Report dated Feb. 21, 2017 in PCT/JP2016/085428 filed Nov. 29, 2016 (with English Translation).
Written Opinion dated Feb. 21, 2017 in PCT/JP2016/085428 filed Nov. 29, 2016.

* cited by examiner

GLASS PLATE WITH ANTIREFLECTION FILM

TECHNICAL FIELD

The present invention relates to a glass sheet with an antireflection film.

BACKGROUND ART

Since a glass sheet with an antireflection film has a high transmittance, the application thereof to various fields can be expected. The glass sheet with an antireflection film is configured by arranging a laminated film on at least one surface of a glass sheet. By properly selecting respective layers configuring the laminated film, a light reflection-reducing effect can be obtained, and thereby a glass sheet with an antireflection film having a high transmittance can be obtained.

In such a glass sheet with an antireflection film, for example, in the case where heating is performed in a strengthening step or a later processing step of the glass sheet after film formation of the antireflection film, there arise problems of a change in color tint of the antireflection film, a decrease in transmittance, an increase in haze, and the like. Thus, there has been a problem that it is difficult to obtain a glass sheet with an antireflection film having a preferable appearance performance.

For example, in Patent Literature 1, it is described to suppress crack occurrence at the time of heating by using a monolayer film of a titanium oxynitride layer, a laminated film containing a titanium oxynitride layer and a zirconium oxide layer, or a laminated film containing a titanium oxynitride layer and a zirconium oxide layer, as a high refractive index film on a glass sheet.

However, for further use in various use applications in future, there has been desired a glass sheet with an antireflection film having a better appearance performance than before.

CITATION LIST

Patent Literature

Patent Literature 1: WO2006/080502

SUMMARY OF INVENTION

Technical Problem

It is an object to provide a glass sheet with an antireflection film, which has a good appearance performance even when heating is performed in a state that the film is attached and is capable of suitably being used in various use applications.

Solution to Problem

The glass sheet with an antireflection film according to one embodiment of the present invention contains a glass sheet, a first transparent high refractive index layer located on the glass sheet, a first transparent low refractive index layer located on the first transparent high refractive index layer, a second transparent high refractive index layer located on the first transparent low refractive index layer, and a second transparent low refractive index layer located on the second transparent high refractive index layer, has a haze after heating at 600° C. to 700° C. for 15 minutes being 0.4% or less, and has a visible light reflectance measured from the side of the second transparent low refractive index layer based on JIS R 3106 being 1.0% or less.

Advantageous Effects of Invention

There can be provided a glass sheet with an antireflection film, which has a good appearance performance even when heating is performed in a state that the film is attached and is capable of suitably being used in various use applications.

DESCRIPTION OF EMBODIMENTS

The following will explain embodiments of the present invention in detail with reference to Drawings.

First Embodiment

Figure 1:
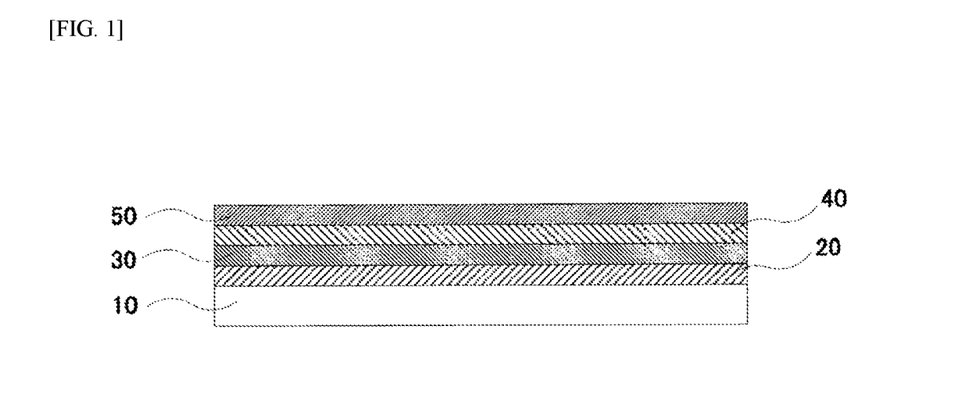
FIG. 1 It is a cross-sectional view schematically illustrating a glass sheet with an antireflection film according to a first embodiment of the present invention.

FIG. 1 is a cross-sectional view schematically illustrating a glass sheet with an antireflection film according to a first embodiment of the present invention. With reference to FIG. 1, the glass sheet with an antireflection film according to the first embodiment of the present invention will be briefly described.

As illustrated in FIG. 1, the glass sheet with an antireflection film according to the first embodiment of the present invention is configured by a glass sheet 10, a first transparent high refractive index layer 20, a first transparent low refractive index layer 30, a second transparent high refractive index layer 40, and a second transparent low refractive index layer 50. Main layers to be provided on the glass sheet 10 are the above four layers but another layer may be provided in a range where it does not depart from the gist of the present invention. By alternately laminating the above-described transparent high refractive index layers and transparent low refractive index layers, an effect as an antireflection film can be obtained.

In the present Description, the term "transparent" means a state that the extinction coefficient at a wavelength of 400 nm is 0.01 or less. By using a film that is transparent, the visible light transmittance can be increased and also the color tone of a transmitted light can be kept good, so that the use is preferred. In the case where the extinction coefficient at a wavelength of 400 nm becomes more than 0.01, the visible light transmittance receives an influence that cannot be ignored and also there arises a problem that a transmitted light is tinted yellow.

Also in the glass sheets with an antireflection film in the second to fourth embodiments to be described below in addition to the present embodiment, the haze after heating at 600° C. to 700° C. for 15 minutes is 0.4% or less and the visible light reflectance (Rv) measured from the side of the antireflection film is 1.0% or less based on JIS R 3106. Here, the term "heating at 600° C. to 700° C. for 15 minutes" means the case where heating is performed at any temperature ranging from 600° C. to 700° C. for 15 minutes. The temperature may be constant for 15 minutes, or the temperature may be changed in the range of 600° C. to 700° C.

As more preferable embodiment, the visible light reflectance (Rv) is 0.5% or less, the haze is 0.3% or less, and/or color change ΔE after heating at 600° C. to 700° C. for 15 minutes is 5 or less, more preferably 2 or less.

The visible light reflectance can be measured by, for example, subjecting the surface of the glass sheet, on which the antireflection film is not located, to an antireflection treatment (surface-roughening treatment).

The glass sheet 10 is, for example, composed of an alkali-free glass, a soda-lime glass, an aluminosilicate glass, or the like, and may be strengthened. The strengthening method is not limited and may be a physical strengthening or a chemical strengthening. The thickness of the glass sheet 10 may be achieved by appropriate adjustment within about 0.2 to 5 mm. In the case of a glass sheet that is a soda-lime glass and is chemically strengthened, it contains, in terms of mass % based on oxides, 60 to 75% of $SiO_2$, 2 to 12% of $Al_2O_3$, 2 to 11% of MgO, 0 to 10% of CaO, 0 to 3% of SrO, 0 to 3% of BaO, 10 to 18% of $Na_2O$, 0 to 8% of $K_2O$, and 0 to 4% of $ZrO_2$ (total of the above components is 100% or less and usually 95% or more). In the case of a glass sheet that is an aluminosilicate glass and is chemically strengthened, it contains, in terms of mol % based on oxides, 61 to 70% of $SiO_2$, 1 to 18% of $Al_2O_3$, 0 to 15% of MgO, 0 to 5% of CaO, 0 to 1% of SrO, 0 to 1% of BaO, 8 to 18% of $Na_2O$, 0 to 6% of $K_2O$, 0 to 4% of $ZrO_2$, and 0 to 8% of $B_2O_3$.

The first transparent high refractive index layer 20 is composed of a titanium oxide doped with a zirconium oxide, which is more specifically, for example, $TiO_2$ doped with $ZrO_2$. The doping amount of the zirconium oxide is 27 to 50 mol % and the refractive index of the first transparent high refractive index layer 20 is 2.25 or more at a wavelength of 630 nm. The thickness of the first transparent high refractive index layer 20 is preferably in the range of 5 nm to 40 nm. More preferably, the doping amount of the zirconium oxide is 30 to 40 mol %. By controlling the doping amount of the zirconium oxide to 30 to 40 mol %, it is possible to form a glass sheet with an antireflection film, which has further good appearance even when heated.

The first transparent low refractive index layer 30 is mainly composed of a silicon oxide, which is more specifically $SiO_2$. The first transparent low refractive index layer 30 has a refractive index that is smaller than those of the first transparent high refractive index layer 20 and the second transparent high refractive index layer 40 which are arranged above and below the layer 30. The first transparent low refractive index layer 30 has, for example, a refractive index ranging from 1.4 to 1.8 at a wavelength of 630 nm. The thickness of the first transparent low refractive index layer 30 is preferably in the range of 5 nm to 50 nm. In the present application, the term "mainly composed of a material A" means that the objective layer contains the material A in an amount of at least 50 mol %. These layers can be formed using a sputtering method, a CVD (Chemical Vapor Deposition) method, a vapor deposition method, or the like.

The second transparent high refractive index layer 40 is, for example, composed of a titanium oxide or a titanium oxide doped with a zirconium oxide, which is more specifically, for example, $TiO_2$ doped with $ZrO_2$. The second transparent high refractive index layer 40 may not be doped with a zirconium oxide but one doped with a zirconium oxide is more preferable in view of appearance performance after heating. In the case of doping with a zirconium oxide, the doping amount of the zirconium oxide is 27 to 50 mol %, and the refractive index of the second transparent high refractive index layer 40 is 2.25 or more at a wavelength of 630 nm. The thickness of the second transparent high refractive index layer 40 is preferably in the range of 30 nm to 130 nm. As in the case of the first transparent high refractive index layer 20, more preferably, the doping amount of the zirconium oxide is 30 to 40 mol %. In the case of doping with a zirconium oxide, it is preferable to use the second transparent high refractive index layer 40 having a doping amount the same as that of the above-described first transparent high refractive index layer 20, but one having a doping amount larger than that of the first transparent high refractive index layer 20 may be used. By using the one having a doping amount larger than that of the first transparent high refractive index layer 20, cracks owing to stress are hardly generated even at the time of bending the glass sheet with an antireflection film according to the first embodiment of the present invention by heating and thus, the glass plate can be suitably used as a bent glass, so that the use is preferred.

The second transparent low refractive index layer 50 is, for example, composed of a silicon oxide or a silicon oxide doped with a zirconium oxide, which is more specifically, for example, $SiO_2$ doped with $ZrO_2$. The $ZrO_2$-doped $SiO_2$ layer shows good resistance against alkali. Therefore, in the glass sheet with an antireflection film according to the present embodiment, the $ZrO_2$-doped $SiO_2$ layer arranged as the second transparent low refractive index layer 50 exhibits a function as a protection film against alkali. Accordingly, even when the glass sheet with an antireflection film of the present embodiment comes into contact with water containing an alkali component, deterioration of the antireflection film can be significantly suppressed.

As the second transparent low refractive index layer 50, an $SiO_2$ film may be used without using a silicon oxide doped with a zirconium oxide. Even by this configuration, it is possible to realize an antireflection film having a good appearance performance even after a heating step, which is a purpose of the present invention. However, since a layer mainly composed of a silicon oxide has a property of poor resistance against alkali, a silicon oxide doped with a zirconium oxide is more preferably used in the case of the use under an environment where alkali resistance is required.

The doping amount of the zirconium oxide in the second transparent low refractive index layer 50 is 5 to 50 mol %, more preferably 8 to 20 mol %. By doping the zirconium oxide in this range, the alkali resistance is improved. Furthermore, the second transparent low refractive index layer 50 more preferably has an average hydrogen concentration $C_{av}$ of less than 10 atom %. By controlling the hydrogen concentration in this way, the protection function by the second transparent low refractive index layer 50 is further more improved.

Here, the average hydrogen concentration $C_{av}$ of the second transparent low refractive index layer 50 means a value measured by a high resolution ERDA (High Resolution Elastic Recoil Detection Analysis: HR-ERDA) method. The following will describe the details of the method of evaluating the average hydrogen concentration $C_{av}$ by the HR-ERDA method.

For the measurement of the hydrogen concentration, a high resolution RBS analyzing device (HRBS500: manufactured by Kobe Steel, Ltd.) was used and analysis was performed by the HR-ERDA method.

Set parameters at the measurement are as follows:
Energy of incident ion: 480 keV
Ion species: $N^+$
Set scattering angle: 30°
Incident angle: 70° with respect to a normal line on a sample surface
Current: about 2 nA
Amount of irradiation: about 1.6 µC.

Incidentally, for preventing static charge at the measurement, in each sample, before the measurement, about 5 nm of a carbon film was formed on the second transparent low refractive index layer 50.

In order to avoid an influence from the carbon film, the hydrogen concentration was calculated as an average hydrogen concentration $C_{av}$ by averaging values at a depth range of 15 nm to 20 nm in the measurement results (a graph showing a relation between the depth from the surface and the hydrogen intensity).

The $ZrO_2$-doped $SiO_2$ layer having the average hydrogen concentration $C_{av}$ of less than 10 atom % can be, for example, formed by sufficiently lowering the hydrogen concentration in the atmosphere at the time of film formation by a sputtering method or the like.

Examples of methods for sufficiently lowering the hydrogen concentration in the atmosphere of film formation, include a method of baking the film formation chamber before film formation to sufficiently evacuate water and by-products such as hydrocarbon compounds absorbed on the wall surface of the film formation chamber, a method of arranging a cold trap that absorbs water and the by-products in the film formation chamber, a method of heating base materials beforehand to sufficiently degas water and by-products contained in the base materials, and the like.

The second transparent low refractive index layer 50 has a refractive index that is smaller than those of the first transparent high refractive index layer 20 and the second transparent high refractive index layer 40 which are provided below. The second transparent low refractive index layer 50 has, for example, a refractive index ranging from 1.4 to 1.8 at a wavelength of 630 nm. The thickness of the second transparent low refractive index layer 50 is preferably in the range of 65 nm to 120 nm.

In the present embodiment, as the first transparent high refractive index layer 20, a titanium oxide doped with a zirconium oxide, specifically $TiO_2$ doped with $ZrO_2$ is used. Since a titanium oxide shrinks through proceeding of crystallization when a thermal treatment is performed and thus cracks and haze are generated to deteriorate the appearance, it is difficult to apply to a substrate which is to be subjected to a thermal treatment. On the other hand, in the case where a zirconium oxide is doped, it is possible to prevent the generation of cracks and haze even when a thermal treatment is performed after film formation. In the present embodiment, since the zirconium oxide is doped into the first transparent high refractive index layer 20 that is close to the glass sheet 10, it is possible to form a glass sheet with an antireflection film, which has a further good appearance performance even after heating. In addition, in the case where the second transparent high refractive index layer 40 is also doped with a zirconium oxide, it is possible to form a glass sheet with an antireflection film, which more stably has a good appearance performance.

In the present embodiment, the first transparent high refractive index layer 20 is composed of a titanium oxide doped with a zirconium oxide and the first transparent low refractive index layer 30 is composed of a silicon oxide that is not doped with a zirconium oxide. By adopting this combination, the color change ΔE after heating can be easily suppressed as compared with the case where a silicon oxide doped with a zirconium oxide is used as the first transparent low refractive index layer 30, so that the embodiment is preferred.

Second Embodiment

Figure 2:
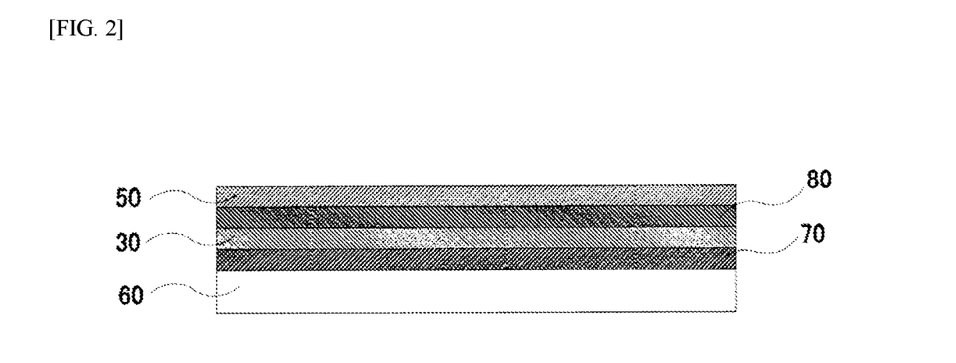
FIG. 2 It is a cross-sectional view schematically illustrating a glass sheet with an antireflection film according to a second embodiment of the present invention.

FIG. 2 is a cross-sectional view schematically illustrating a glass sheet with an antireflection film according to a second embodiment of the present invention. With reference to FIG. 2, the glass sheet with an antireflection film according to the second embodiment of the present invention will be described.

As illustrated in FIG. 2, the glass sheet with an antireflection film according to the second embodiment is also configured by a first transparent high refractive index layer 70, a first transparent low refractive index layer 30, a second transparent high refractive index layer 80, and a second transparent low refractive index layer 50, which are located on or above a glass sheet 60, as in the above-described first embodiment. Here, since the same films as in the above-described first embodiment can be used as the first transparent low refractive index layer and the second transparent low refractive index layer, the same reference numerals and signs are used. As the glass sheet 60, the same one as in the above-described first embodiment can be used and hence the description thereof is omitted here.

The first transparent high refractive index layer 70 is composed of a titanium oxide doped with a silicon oxide, which is more specifically, for example, $TiO_2$ doped with $SiO_2$. The doping amount of the silicon oxide is 12 to 30 mol % and the refractive index is 2.10 or more at a wavelength of 630 nm. The thickness of the first transparent high refractive index layer 70 is preferably in the range of 5 nm to 40 nm.

The first transparent low refractive index layer 30 is mainly composed of a silicon oxide, which is more specifically $SiO_2$. The first transparent low refractive index layer 30 has a refractive index that is smaller than those of the first transparent high refractive index layer 70 and the second transparent high refractive index layer 80 which are arranged above and below. The first transparent low refractive index layer 30 has, for example, a refractive index ranging from 1.4 to 1.8 at a wavelength of 630 nm. The thickness of the first transparent low refractive index layer 30 is preferably in the range of 5 nm to 50 nm.

The second transparent high refractive index layer 80 is, for example, composed of a titanium oxide or a titanium oxide doped with a silicon oxide, which is more specifically, for example, $TiO_2$ doped with $SiO_2$. The second transparent high refractive index layer 80 may not be doped with a silicon oxide but one doped with a silicon oxide is more preferable in view of appearance performance after heating. In the case of doping with a silicon oxide, the doping amount of the silicon oxide is 12 to 30 mol %, and the refractive index of the second transparent high refractive index layer 80 is 2.10 or more at a wavelength of 630 nm. The thickness of the second transparent high refractive index layer 80 is preferably in the range of 30 nm to 130 nm. In the case of doping with a silicon oxide, it is preferable to use the second transparent high refractive index layer 80 having a doping amount the same as that of the above-described first transparent high refractive index layer 70, but one having a doping amount larger than that of the first transparent high refractive index layer 70 may be used. By using the one having a doping amount larger than that of the first transparent high refractive index layer 70, cracks owing to stress are hardly generated even at the time of bending the glass sheet with an antireflection film according to the second embodiment of the present invention by heating and thus, the glass plate can be suitably used as a bent glass, so that the use is preferred.

The second transparent low refractive index layer 50 is, for example, composed of a silicon oxide or a silicon oxide doped with a zirconium oxide, and is more specifically composed of $SiO_2$ doped with $ZrO_2$. The $ZrO_2$-doped $SiO_2$ layer shows good resistance against alkali. Therefore, in the glass sheet with an antireflection film according to the present embodiment, the $ZrO_2$-doped $SiO_2$ layer arranged as the second transparent low refractive index layer 50 exhibits a function as a protection film against alkali. Accordingly, even when the glass sheet with an antireflection film of the present embodiment comes into contact with water containing an alkali component, deterioration of the antireflection film can be significantly suppressed.

As the second transparent low refractive index layer 50, an $SiO_2$ film may be used without using a silicon oxide doped with a zirconium oxide. Even by this configuration, it is possible to realize an antireflection film having a good appearance performance even after a heating step, which is a purpose of the present invention. However, since a layer mainly composed of a silicon oxide has a property of poor resistance against alkali, a silicon oxide doped with a zirconium oxide is more preferably used in the case of the use under an environment where alkali resistance is required.

The doping amount of the zirconium oxide in the second transparent low refractive index layer 50 is 5 to 50 mol %, and more preferably 8 to 20 mol %. By doping the zirconium oxide in this range, the alkali resistance is improved. Furthermore, the second transparent low refractive index layer 50 more preferably has an average hydrogen concentration $C_{av}$ of less than 10 atom %. By controlling the hydrogen concentration in this way, the protection function by the second transparent low refractive index layer 50 is further more improved.

The second transparent low refractive index layer 50 has a refractive index that is smaller than those of the first transparent high refractive index layer 70 and the second transparent high refractive index layer 80 which are provided below. The second transparent low refractive index layer 50 has, for example, a refractive index ranging from 1.4 to 1.8 at a wavelength of 630 nm. The thickness of the second transparent low refractive index layer 50 is preferably in the range of 65 nm to 120 nm.

In the present embodiment, as the first transparent high refractive index layer 70, a titanium oxide doped with a silicon oxide, specifically $TiO_2$ doped with $SiO_2$ is used. Since a titanium oxide shrinks through proceeding of crystallization when a thermal treatment is performed and thus cracks are generated to deteriorate the appearance, it is difficult to apply to a substrate which is to be subjected to a thermal treatment. On the other hand, in the case where a silicon oxide is doped, it is possible to prevent the generation of cracks even when a thermal treatment is performed after film formation. In the present embodiment, since the silicon oxide is doped into the first transparent high refractive index layer 70 that is close to the glass sheet 10, it is possible to form a glass sheet with an antireflection film, which has a further good appearance performance even after heating. In addition, in the case where the second transparent high refractive index layer 80 is also doped with a silicon oxide, it is possible to form a glass sheet with an antireflection film, which more stably has a good appearance performance.

In the present embodiment, the first transparent high refractive index layer 70 is composed of a titanium oxide doped with a silicon oxide and the first transparent low refractive index layer 30 is composed of a silicon oxide that is not doped with a zirconium oxide. By adopting this combination, the color change ΔE after heating can be easily suppressed as compared with the case where a silicon oxide doped with a zirconium oxide is used as the first transparent low refractive index layer 30, so that the embodiment is preferred.

Third Embodiment

Figure 3:
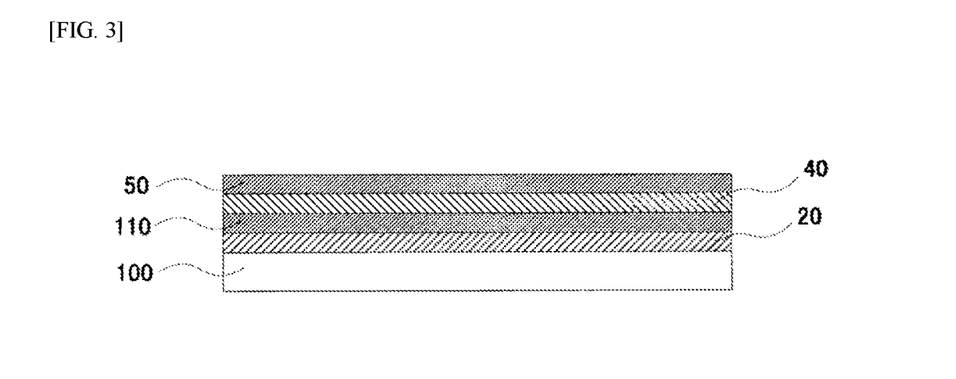
FIG. 3 It is a cross-sectional view schematically illustrating a glass sheet with an antireflection film according to a third embodiment of the present invention.

FIG. 3 is a cross-sectional view schematically illustrating a glass sheet with an antireflection film according to a third embodiment of the present invention. With reference to FIG. 3, the glass sheet with an antireflection film according to the third embodiment of the present invention will be described.

As illustrated in FIG. 3, the glass sheet with an antireflection film according to the second embodiment of the present invention is also configured by a first transparent high refractive index layer 20, a first transparent low refractive index layer 110, a second transparent high refractive index layer 40, and a second transparent low refractive index layer 50, which are located on or above a glass sheet 100, as in the above-described first embodiment. Here, since the same films as in the above-described first embodiment can be used as the first transparent high refractive index layer, the second transparent high refractive index layer and the second transparent low refractive index layer, the same reference numerals and signs are used. As the glass sheet 100, the same one as in the above-described first embodiment can be used and hence the description thereof is omitted here.

The first transparent high refractive index layer 20 is composed of a titanium oxide doped with a zirconium oxide, which is more specifically, for example, $TiO_2$ doped with $ZrO_2$. The doping amount of the zirconium oxide is 27 to 50 mol % and the refractive index of the first transparent high refractive index layer 20 is 2.25 or more at a wavelength of 630 nm. The thickness of the first transparent high refractive index layer 20 is preferably in the range of 5 nm to 40 nm. More preferably, the doping amount of the zirconium oxide is 30 to 40 mol %. By controlling the doping amount of the zirconium oxide to 30 to 40 mol %, it is possible to form a glass sheet with an antireflection film, which has further good appearance even when heated.

The first transparent low refractive index layer 110 is composed of a silicon oxide doped with a zirconium oxide, and is more specifically composed of $SiO_2$ doped with $ZrO_2$. The doping amount of the zirconium oxide in the first transparent low refractive index layer 110 is 5 to 50 mol %, and more preferably 8 to 20 mol %. By doping the zirconium oxide in this range, the alkali resistance is improved.

The second transparent high refractive index layer 40 is, for example, composed of a titanium oxide or a titanium oxide doped with a zirconium oxide, which is more specifically, for example, $TiO_2$ doped with $ZrO_2$. The second transparent high refractive index layer 40 may not be doped with a zirconium oxide but one doped with a zirconium oxide is more preferable in view of appearance performance after heating. In the case of doping with a zirconium oxide, the doping amount of the zirconium oxide is 27 to 50 mol %, and the refractive index of the second transparent high refractive index layer 40 is 2.25 or more at a wavelength of 630 nm. The thickness of the second transparent high refractive index layer 40 is preferably in the range of 30 nm to 130 nm. As in the case of the first transparent high refractive index layer 20, more preferably, the doping amount of the zirconium oxide is 30 to 40 mol %. In the case of doping with a zirconium oxide, it is preferable to use the second transparent high refractive index layer 40 having a doping amount the same as that of the above-described first transparent high refractive index layer 20, but one having a doping amount larger than that of the first transparent high refractive index layer 20 may be used. By using the one having a doping amount larger than that of the first transparent high refractive index layer 20, cracks owing to stress are hardly generated even at the time of bending the glass sheet with an antireflection film according to the third embodiment of the present invention by heating and thus, the glass plate can be suitably used as a bent glass, so that the use is preferred.

The second transparent low refractive index layer 50 is, for example, composed of a silicon oxide doped with a zirconium oxide, which is more specifically $SiO_2$ doped with $ZrO_2$. The $ZrO_2$-doped $SiO_2$ layer shows good resistance against alkali. Therefore, in the glass sheet with an antireflection film according to the present embodiment, the $ZrO_2$-doped $SiO_2$ layer arranged as the second transparent low refractive index layer 50 exhibits a function as a protection film against alkali. Accordingly, even when the glass sheet with an antireflection film of the present embodiment comes into contact with water containing an alkali component, deterioration of the antireflection film can be significantly suppressed.

The doping amount of the zirconium oxide in the second transparent low refractive index layer 50 is 5 to 50 mol %, more preferably 8 to 20 mol %. By doping the zirconium oxide in this range, the alkali resistance is improved. Furthermore, the second transparent low refractive index layer 50 more preferably has an average hydrogen concentration $C_{av}$ of less than 10 atom %. By controlling the hydrogen concentration in this way, the protection function by the second transparent low refractive index layer 50 is further more improved.

In the present embodiment, as the first transparent low refractive index layer 110, a silicon oxide doped with a zirconium oxide is used as in the case of the second transparent low refractive index layer 50. By using the silicon oxide doped with a zirconium oxide as the first transparent low refractive index layer 110, chemical resistance can be improved as compared with the case where a silicon oxide that is not doped with a zirconium oxide is used as the first transparent low refractive index layer 110, so that the present embodiment is preferred. Since zirconium is doped into all the layers, use can be made in various environments.

Fourth Embodiment

Figure 4:
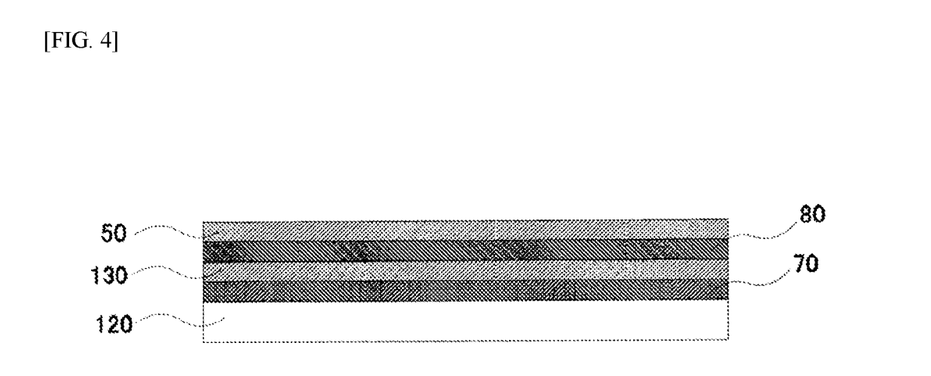
FIG. 4 It is a cross-sectional view schematically illustrating a glass sheet with an antireflection film according to a fourth embodiment of the present invention.

FIG. 4 is a cross-sectional view schematically illustrating a glass sheet with an antireflection film according to a fourth embodiment of the present invention. With reference to FIG. 4, the glass sheet with an antireflection film according to the fourth embodiment of the present invention will be described.

As illustrated in FIG. 4, the glass sheet with an antireflection film according to the fourth embodiment of the present invention is also configured by a first transparent high refractive index layer 70, a first transparent low refractive index layer 130, a second transparent high refractive index layer 80, and a second transparent low refractive index layer 50, which are located on or above a glass sheet 120, as in the above-described second embodiment. Here, since the same films as in the above-described first embodiment can be used as the first transparent high refractive index layer, the second transparent high refractive index layer and the second transparent low refractive index layer, the same reference numerals and signs are used. As the glass sheet 120, the same one as in the above-described first embodiment can be used and hence the description thereof is omitted here.

The first transparent high refractive index layer 70 is composed of a titanium oxide doped with a silicon oxide, which is more specifically, for example, $TiO_2$ doped with $SiO_2$. The doping amount of the silicon oxide is 12 to 30 mol % and the refractive index is 2.10 or more at a wavelength of 630 nm. The thickness of the first transparent high refractive index layer 70 is preferably in the range of 5 nm to 40 nm.

The first transparent low refractive index layer 130 is composed of a silicon oxide doped with a zirconium oxide, and is more specifically composed of $SiO_2$ doped with $ZrO_2$. The doping amount of the zirconium oxide in the first transparent low refractive index layer 130 is 5 to 50 mol %, and more preferably 8 to 20 mol %. By doping the zirconium oxide in this range, the alkali resistance is improved.

The second transparent high refractive index layer 80 is, for example, composed of a titanium oxide or a titanium oxide doped with a silicon oxide, which is more specifically, for example, $TiO_2$ doped with $SiO_2$. The second transparent high refractive index layer 80 may not be doped with a silicon oxide but one doped with a silicon oxide is more preferable in view of appearance performance after heating. In the case of doping with a silicon oxide, the doping amount of the silicon oxide is 12 to 30 mol %, and the refractive index of the second transparent high refractive index layer 80 is 2.10 or more at a wavelength of 630 nm. The thickness of the second transparent high refractive index layer 80 is preferably in the range of 30 nm to 130 nm. In the case of doping with a silicon oxide, it is preferable to use the second transparent high refractive index layer 80 having a doping amount the same as that of the above-described first transparent high refractive index layer 70, but one having a doping amount larger than that of the first transparent high refractive index layer 70 may be used. By using the one having a doping amount larger than that of the first transparent high refractive index layer 70, cracks owing to stress are hardly generated even at the time of bending the glass sheet with an antireflection film according to the fourth embodiment of the present invention by heating and thus, the glass plate can be suitably used as a bent glass, so that the use is preferred.

The second transparent low refractive index layer 50 is composed of a silicon oxide doped with a zirconium oxide, and is more specifically composed of $SiO_2$ doped with $ZrO_2$. The $ZrO_2$-doped $SiO_2$ layer shows good resistance against alkali. Therefore, in the glass sheet with an antireflection film according to the present embodiment, the $ZrO_2$-doped $SiO_2$ layer arranged as the second transparent low refractive index layer 50 exhibits a function as a protection film against alkali. Accordingly, even when the glass sheet with an antireflection film of the present embodiment comes into contact with water containing an alkali component, deterioration of the antireflection film can be significantly suppressed.

The doping amount of the zirconium oxide in the second transparent low refractive index layer 50 is 5 to 50 mol %, and more preferably 8 to 20 mol %. By doping the zirconium oxide in this range, the alkali resistance is improved. Furthermore, the second transparent low refractive index layer 50 more preferably has an average hydrogen concentration $C_{av}$ of less than 10 atom %. By controlling the hydrogen concentration in this way, the protection function against water containing an alkali component by the second transparent low refractive index layer 50 is further more improved.

In the present embodiment, as the first transparent low refractive index layer 130, a silicon oxide doped with a zirconium oxide, which is the same as in the case of the second transparent low refractive index layer 50, is used. By using the silicon oxide doped with a zirconium oxide as the first transparent low refractive index layer 130, chemical resistance can be improved as compared with the case where a silicon oxide that is not doped with a zirconium oxide is used as the first transparent low refractive index layer 130, so that the present embodiment is preferred. Since zirconium is doped into all the layers, use can be made in various environments.

Fifth Embodiment

Figure 5:
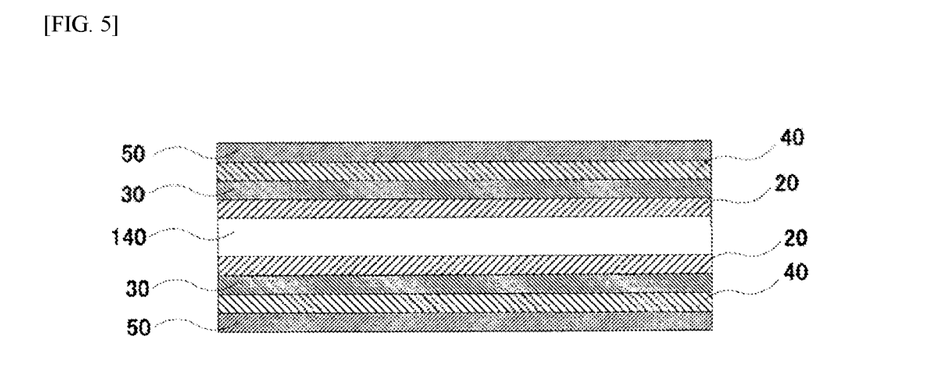
FIG. 5 It is a cross-sectional view schematically illustrating a glass sheet with an antireflection film according to a fifth embodiment of the present invention.

FIG. 5 is a cross-sectional view schematically illustrating a glass sheet with an antireflection film according to a fifth embodiment of the present invention. With reference to FIG. 5, the glass sheet with an antireflection film according to the fifth embodiment of the present invention will be described.

As illustrated in FIG. 5, a difference between the glass sheet with an antireflection film according to the fifth embodiment and the above-described glass sheets with an antireflection film according to the first to fourth embodiments is that an antireflection film is provided on both surfaces of the glass sheet 140. As the glass sheet 140, the same one as in the above-described first embodiment can be used and hence the description thereof is omitted here. Since the same films as in the above-described first to fourth embodiments can be used as the first transparent high refractive index layer 20, the first transparent low refractive index layer 30, the second transparent high refractive index layer 40, and the second transparent low refractive index layer 50, which are provided on or above the both surfaces of the glass sheet 140, the same reference numerals and signs are used. In FIG. 5, the same reference numerals and signs are conveniently used as in the films of the first embodiment but they are not limited thereto.

In the glass sheet with an antireflection film in the present embodiment, the haze after heating at 600° C. to 700° C. for 15 minutes is 0.4% or less and the visible light reflectance (Rv) measured based on JIS R 3106 is 2.0% or less from both sides. Here, the term "heating at 600° C. to 700° C. for 15 minutes" means a case where heating is performed at any temperature ranging from 600° C. to 700° C. for 15 minutes. The temperature may be constant for 15 minutes, or the temperature may be changed in the range of 600° C. to 700° C.

As more preferable embodiment, the visible light reflectance (Rv) is 1.0% or less, the haze is 0.3% or less, and/or color change ΔE after heating at 600° C. to 700° C. for 15 minutes is 5 or less, more preferably 2 or less.

In the case where the antireflection film is located on both surfaces of the glass sheet as in the fifth embodiment, a low visible light reflectance can be realized from either side. For example, the glass sheet can be suitably used in use applications where a low visible light reflectance is required from either side, for example, the case of the use as a window glass of buildings and, since the appearance performance is good even when heated, it can be suitably used also in the case where strengthening and/or bend processing are required.

Sixth Embodiment

Figure 6:
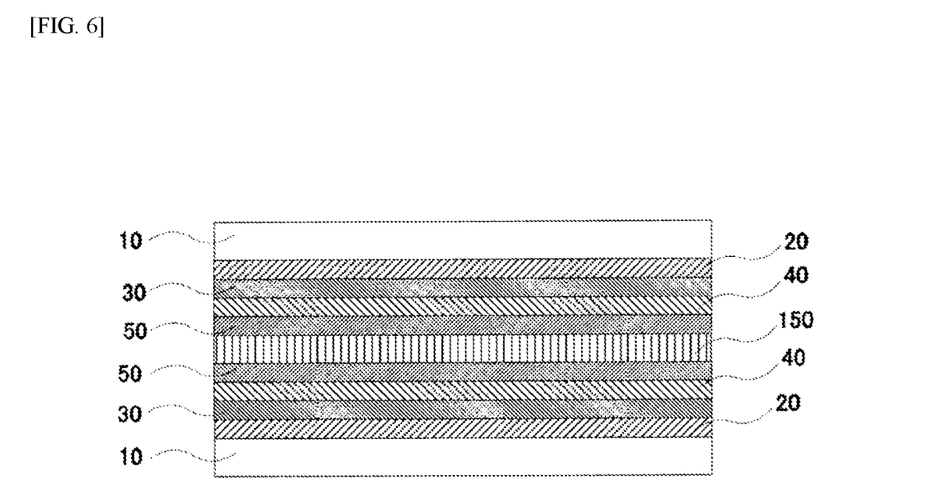
FIG. 6 It is a cross-sectional view schematically illustrating a glass laminate according to a sixth embodiment of the present invention.

FIG. 6 is a cross-sectional view schematically illustrating a glass laminate according to a sixth embodiment of the present invention. With reference to FIG. 6, the glass laminate according to the sixth embodiment of the present invention will be described.

As illustrated in FIG. 6, the sixth embodiment is a glass laminate in which the above-described glass sheets with an antireflection film according to the first to fourth embodiments are laminated with an intermediate film 150. In FIG. 6, the glass sheet with an antireflection film according to the first embodiment is conveniently laminated, but it is not limited thereto. As the intermediate film 150, one used for conventional glass laminates can be used.

In the case where the glass laminate is used as in the present embodiment, since the antireflection film is not exposed outside, the film is difficult to deteriorate, so that the embodiment is preferred.

EXAMPLES

The following will describe Examples of the present invention. In the following explanation, Examples 1 to 3 and Examples 8 to 10 are working examples and Examples 4 to 7 and Examples 11 to 14 are comparative examples.

Example 1

A laminated film was formed on one surface of a glass sheet by the following method to manufacture a glass sheet with an antireflection film.

First, there was prepared a glass substrate (soda-lime glass) having a length of 50 mm, a width of 50 mm, and a thickness of 3 mm.

Then, a laminated film was formed on one surface of the glass substrate by a sputtering method. The laminated film has the following layer configuration from the side close to the glass substrate:

First transparent high refractive index layer: 35.3 mol % $ZrO_2$-doped $TiO_2$ layer
First transparent low refractive index layer: $SiO_2$ layer
Second transparent high refractive index layer: 35.3 mol % $ZrO_2$-doped $TiO_2$ layer
Second transparent low refractive index layer: 10.0 mol % $ZrO_2$-doped $SiO_2$ layer The first transparent high refractive index layer was formed by a sputtering method under an atmosphere of $Ar+O_2$ (oxygen: 40 volume %) by using a Ti target doped with 30 atom % of Zr as a target. The sputtering pressure was set to 0.37 Pa.

The first transparent low refractive index layer was formed by a sputtering method under an atmosphere of Ar+$O_2$ (oxygen: 60 volume %) by using an Si target as a target. The sputtering pressure was set to 0.37 Pa.

The second transparent high refractive index layer was formed by a sputtering method under an atmosphere of Ar+$O_2$ (oxygen: 40 volume %) by using a Ti target doped with 30 atom % of Zr as a target. The sputtering pressure was set to 0.37 Pa.

The second transparent low refractive index layer was formed by a sputtering method under an atmosphere of Ar+$O_2$ (oxygen: 60 volume %) by using an Si target doped with 10 atom % of Zr as a target. The sputtering pressure was set to 0.37 Pa.

An antireflection treatment (surface roughening treatment) was performed on the surface at the side of the glass sheet, on which the laminated film was not arranged.

Example 2

A glass sheet with an antireflection film was manufactured by the same method as in Example 1. However, in Example 2, the laminated film had the following layer configuration:
First transparent high refractive index layer: 35.3 mol % $ZrO_2$-doped $TiO_2$ layer
First transparent low refractive index layer: 10.0 mol % $ZrO_2$-doped $SiO_2$ layer
Second transparent high refractive index layer: 35.3 mol % $ZrO_2$-doped $TiO_2$ layer
Second transparent low refractive index layer: 10.0 mol % $ZrO_2$-doped $SiO_2$ layer Example 3

A glass sheet with an antireflection film was manufactured by the same method as in Example 1. However, in Example 3, the laminated film had the following layer configuration:
First transparent high refractive index layer: 20.2 mol % $SiO_2$-doped $TiO_2$ layer
First transparent low refractive index layer: $SiO_2$ layer
Second transparent high refractive index layer: 20.2 mol % $SiO_2$-doped $TiO_2$ layer
Second transparent low refractive index layer: 10.0 mol % $ZrO_2$-doped $SiO_2$ layer
The first and second transparent high refractive index layers were formed by a sputtering method under an atmosphere of Ar+$O_2$ (oxygen: 12 volume %) by using a TiOx target (x<2) doped with 8 mass % of Si as a target. The sputtering pressure was set to 0.37 Pa.

Example 4

A glass sheet with an antireflection film was manufactured by the same method as in Example 1. However, in Example 4, the laminated film had the following layer configuration:
First transparent high refractive index layer: 26.2 mol % $ZrO_2$-doped $TiO_2$ layer
First transparent low refractive index layer: $SiO_2$ layer
Second transparent high refractive index layer: 26.2 mol % $ZrO_2$-doped $TiO_2$ layer
Second transparent low refractive index layer: 10.0 mol % $ZrO_2$-doped $SiO_2$ layer
The first and second transparent high refractive index layers were formed by a sputtering method under an atmosphere of Ar+$O_2$ (oxygen: 40 volume %) by using a Ti target doped with 20 atom % Zr as a target. The sputtering pressure was set to 0.37 Pa.

Example 5

A glass sheet with an antireflection film was manufactured by the same method as in Example 1. However, in Example 5, the laminated film had the following layer configuration:
First transparent high refractive index layer: 10.4 mol % $SiO_2$-doped $TiO_2$ layer
First transparent low refractive index layer: $SiO_2$ layer
Second transparent high refractive index layer: 10.4 mol % $SiO_2$-doped $TiO_2$ layer
Second transparent low refractive index layer: laminate structure of $SiO_2$ layer and 10.0 mol % $ZrO_2$-doped $SiO_2$ layer
The first and second transparent high refractive index layers were formed by a sputtering method under an atmosphere of Ar+$O_2$ (oxygen: 12 volume %) by using a TiOx target (x<2) doped with 3 mass % of Si as a target. The sputtering pressure was set to 0.37 Pa.

Example 6

A glass sheet with an antireflection film was manufactured by the same method as in Example 1. However, in Example 6, the laminated film had the following layer configuration:
First transparent high refractive index layer: $TiO_2$ layer
First transparent low refractive index layer: $SiO_2$ layer
Second transparent high refractive index layer: $TiO_2$ layer
Second transparent low refractive index layer: 10.0 mol % $ZrO_2$-doped $SiO_2$ layer
The first and second transparent high refractive index layers were formed by a sputtering method under an atmosphere of Ar+$O_2$ (oxygen: 8 volume %) by using a TiOx target (x<2) as a target. The sputtering pressure was set to 0.37 Pa.

Example 7

A glass sheet with an antireflection film was manufactured by the same method as in Example 1. However, in Example 7, the laminated film had the following layer configuration:
First transparent high refractive index layer: $TiO_2$ layer
First transparent low refractive index layer: $SiO_2$ layer
Second transparent high refractive index layer: 35.3 mol % $ZrO_2$-doped $TiO_2$ layer
Second transparent low refractive index layer: 10.0 mol % $ZrO_2$-doped $SiO_2$ layer Example 8

A laminated film having the same configuration as in Example 1 was formed on both main surfaces of the glass sheet by the same method as in Example 1, thereby manufacturing a glass sheet with an antireflection film.

Example 9

A laminated film having the same configuration as in Example 2 was formed on both main surfaces of the glass sheet by the same method as in Example 2, thereby manufacturing a glass sheet with an antireflection film.

Example 10

A laminated film having the same configuration as in Example 3 was formed on both main surfaces of the glass sheet by the same method as in Example 3, thereby manufacturing a glass sheet with an antireflection film.

Example 11

A laminated film having the same configuration as in Example 4 was formed on both main surfaces of the glass sheet by the same method as in Example 4, thereby manufacturing a glass sheet with an antireflection film.

Example 12

A laminated film having the same configuration as in Example 5 was formed on both main surfaces of the glass sheet by the same method as in Example 5, thereby manufacturing a glass sheet with an antireflection film.

Example 13

A laminated film having the same configuration as in Example 6 was formed on both main surfaces of the glass sheet by the same method as in Example 6, thereby manufacturing a glass sheet with an antireflection film.

Example 14

A laminated film having the same configuration as in Example 7 was formed on both main surfaces of the glass sheet by the same method as in Example 7, thereby manufacturing a glass sheet with an antireflection film.

In the manufacture of the glass sheets with an antireflection film of Examples 1 to 14, the same film formation apparatus was used and the film formation was started after the film formation apparatus was thoroughly evacuated.

The following Table 1 summarizes the layer configurations of the glass sheets with an antireflection film of Examples 1 to 14.

(Visible Light Reflectance: Rv)

It can be said that the lower the visible light reflectance Rv of the glass sheet with an antireflection film is, the better the low reflection characteristic is.

In the case where a laminated film was formed only on one main surface as in the glass sheets with an antireflection film of Examples 1 to 7, a light was applied from the side on which the antireflection film was located in a state that the other surface had been subjected to a surface roughening treatment, and the measurement was conducted based on JIS R 3106. In the case of Examples 8 to 14 where the antireflection film was located on both main surfaces of the glass sheet, the measurement was performed without further treatment.

(Color Tone of Transmitted Light: L*, a*, b*)

The color tone of a light transmitted through the glass sheet with an antireflection film can be evaluated by measuring a transmitted color of the glass sheet with an antireflection film by using a common spectrometric device. More specifically, the evaluation can be performed by calculating CIE 1976 L*: a*: b* color system on the basis of optical spectra measured by a measuring device having an integrating sphere detector. In the case where a laminated film was formed only on one main surface as in the glass sheets with an antireflection film of Examples 1 to 7, there was measured a transmitted light of a light that entered from the side on which the antireflection film was located.

(Color Difference before and after Firing: ΔE)

In order to calculate the color difference ΔE before and after firing, first, change amounts ΔL*, Δa*, and Δb* of L*, a*, and b* before and after firing are calculated. Subsequently, ΔE can be calculated by computing the square root of the sum of squared values of respective values of ΔL*, Δa*, and Δb*.

(Haze of Transmitted Light: Hz)

In the case where a laminated film was formed only on one main surface as in the glass sheets with an antireflection film of Examples 1 to 7, the haze of a light that entered from the side on which the antireflection film was located, was

TABLE 1

|  |  | First high refractive index layer | First low refractive index layer | Second high refractive index layer | Second low refractive index layer |
|---|---|---|---|---|---|
| Ex. 1 | film material | $ZrO_2$-doped $TiO_2$ (35.3 mol %) | $SiO_2$ | $ZrO_2$-doped $TiO_2$ (35.3 mol %) | $ZrO_2$-doped $SiO_2$ (10.0 mol %) |
|  | thickness | 11.8 nm | 32.9 nm | 104.8 nm | 83 nm |
| Ex. 2 | film material | $ZrO_2$-doped $TiO_2$ (35.3 mol %) | $ZrO_2$-doped $SiO_2$ (10.0 mol %) | $ZrO_2$-doped $TiO_2$ (35.3 mol %) | $ZrO_2$-doped $SiO_2$ (10.0 mol %) |
|  | thickness | 10.7 nm | 36.4 nm | 104 nm | 83 nm |
| Ex. 3 | film material | $SiO_2$-doped $TiO_2$ (20.2 mol %) | $SiO_2$ | $SiO_2$-doped $TiO_2$ (20.2 mol %) | $ZrO_2$-doped $SiO_2$ (10.0 mol %) |
|  | thickness | 13.8 nm | 36.8 nm | 122 nm | 79.5 nm |
| Ex. 4 | film material | $ZrO_2$-doped $TiO_2$ (26.2 mol %) | $SiO_2$ | $ZrO_2$-doped $TiO_2$ (26.2 mol %) | $ZrO_2$-doped $SiO_2$ (10.0 mol %) |
|  | thickness | 11.8 nm | 35 nm | 105 nm | 84.3 nm |
| Ex. 5 | film material | $SiO_2$-doped $TiO_2$ (10.4 mol %) | $SiO_2$ | $SiO_2$-doped $TiO_2$ (10.4 mol %) | $SiO_2/ZrO_2$-doped $SiO_2$ (10.0 mol %) |
|  | thickness | 13.5 nm | 35 nm | 113.5 nm | 35.3 nm/51 nm |
| Ex. 6 | film material | $TiO_2$ | $SiO_2$ | $TiO_2$ | $ZrO_2$-doped $SiO_2$ (10.0 mol %) |
|  | thickness | 13.1 nm | 35 nm | 113.5 nm | 85.3 nm |
| Ex. 7 | film material | $TiO_2$ | $SiO_2$ | $ZrO_2$-doped $TiO_2$ (35.3 mol %) | $ZrO_2$-doped $SiO_2$ (10.0 mol %) |
|  | thickness | 11 nm | 33.5 nm | 104.3 nm | 83.3 nm |

(Evaluation)

For the glass sheets with an antireflection film of Examples 1 to 14 and ones after firing them at 675° C. for 15 minutes, the following evaluations were carried out.

measured by using a haze meter HZ-2 manufactured by Suga Test Instruments Co., Ltd.

Table 2 shows evaluation results of Examples 1 to 7 and Table 3 shows evaluation results of Examples 8 to 14.

TABLE 2

|  |  | L* | a* | b* | ΔE | Rv (%) | Hz (%) |
|---|---|---|---|---|---|---|---|
| Ex. 1 | before heating | 3.33 | −1.54 | −7.00 | 0.58 | 0.34 | 0.02 |
|  | after heating | 2.88 | −1.89 | −6.88 |  | 0.29 | 0.09 |
| Ex. 2 | before heating | 3.34 | −1.78 | −7.94 | 1.74 | 0.34 | 0.05 |
|  | after heating | 2.76 | −0.77 | −9.24 |  | 0.27 | 0.10 |
| Ex. 3 | before heating | 7.32 | −3.59 | −0.97 | 4.66 | 0.80 | 0.01 |
|  | after heating | 6.13 | −7.89 | −2.35 |  | 0.65 | 0.02 |
| Ex. 4 | before heating | 2.69 | −2.14 | −6.57 | 5.53 | 0.27 | 0.01 |
|  | after heating | 2.21 | −1.81 | −1.07 |  | 0.24 | 1.5 |
| Ex. 5 | before heating | 3.06 | −2.36 | −5.66 | 5.13 | 0.31 | 0.02 |
|  | after heating | 3.38 | −4.76 | −1.13 |  | 0.36 | 1.01 |
| Ex. 6 | before heating | 3.06 | −1.70 | −6.52 | 6.78 | 0.32 | 0.01 |
|  | after heating | 3.54 | −4.61 | −0.41 |  | 0.38 | 0.47 |
| Ex. 7 | before heating | 3.80 | −3.05 | −6.97 | 4.04 | 0.39 | 0.02 |
|  | after heating | 4.04 | −5.64 | −3.87 |  | 0.42 | 0.46 |

TABLE 3

|  |  | L* | a* | b* | ΔE | Rv (%) | Hz (%) |
|---|---|---|---|---|---|---|---|
| Ex. 8 | before heating | 6.84 | −3.17 | −11.51 | 1.31 | 0.71 | 0.03 |
|  | after heating | 5.75 | −3.85 | −11.76 |  | 0.58 | 0.10 |
| Ex. 9 | before heating | 6.83 | −3.60 | −12.69 | 3.29 | 0.69 | 0.05 |
|  | after heating | 5.59 | −1.69 | −15.06 |  | 0.55 | 0.07 |
| Ex. 10 | before heating | 14.43 | −4.81 | −1.49 | 9.02 | 1.78 | 0.01 |
|  | after heating | 11.79 | −13.18 | −3.56 |  | 1.32 | 0.01 |
| Ex. 11 | before heating | 6.03 | −4.23 | −11.53 | 10.38 | 0.60 | 0.01 |
|  | after heating | 3.61 | −4.48 | −1.43 |  | 0.38 | 1.56 |
| Ex. 12 | before heating | 7.37 | −4.68 | −9.93 | 9.16 | 0.76 | 0.02 |
|  | after heating | 7.17 | −9.56 | −2.19 |  | 0.77 | 1.18 |
| Ex. 13 | before heating | 5.98 | −3.96 | −10.80 | 11.52 | 0.61 | 0.05 |
|  | after heating | 7.29 | −9.16 | −0.61 |  | 0.79 | 0.46 |
| Ex. 14 | before heating | 7.88 | −6.10 | −10.89 | 6.77 | 0.82 | 0.06 |
|  | after heating | 8.30 | −11.30 | −6.57 |  | 0.87 | 0.43 |

As is apparent from Table 2, it becomes possible to suppress the visible light reflectance Rv and haze after the heating treatment (firing) by suitably selecting materials of the first transparent high refractive index layer and of the first transparent low refractive index layer as in the above-described embodiments. Furthermore, it was also found that ΔE can be also kept low.

As shown in Table 3, it was found that also in the case where the antireflection film was provided on both main surfaces, the same tendency as in Table 2 was observed.

While the present invention has been described in detail and with reference to specific embodiments thereof, it will be apparent to one skilled in the art that various changes and modifications can be made therein without departing from the spirit and scope thereof. The present application is based on Japanese Patent Application (No. 2015-236620) filed on Dec. 3, 2015, which contents are incorporated herein by reference.

REFERENCE SIGNS LIST 10, 60, 100, 120, 140 Glass sheet
20, 70 First transparent high refractive index layer
30, 110 First transparent low refractive index layer
40, 80 Second transparent high refractive index layer
50, 130 Second transparent low refractive index layer
150 Intermediate film

The invention claimed is:

1. An antireflective glass sheet comprising:
a glass sheet;
a first transparent high refractive index layer positioned on the glass sheet, the first transparent high refractive index layer being composed of a titanium oxide doped with a zirconium oxide, and having a first refractive index;
a first transparent low refractive index layer positioned on the first transparent high refractive index layer, the first transparent low refractive index layer being composed of a silicon oxide or a silicon oxide doped with a zirconium oxide, and having a second refractive index;
a second transparent high refractive index layer positioned on the first transparent low refractive index layer, the second transparent high refractive index layer being composed of a titanium oxide or a titanium oxide doped with a zirconium oxide, and having a third refractive index; and
a second transparent low refractive index layer positioned on the second transparent high refractive index layer, the second transparent low refractive index layer being composed of a silicon oxide or a silicon oxide doped with a zirconium oxide, and having a fourth refractive index,
the second refractive index being lower than the first refractive index and the third refractive index,
the fourth refractive index being lower than the first refractive index and the third refractive index,
the antireflective glass sheet having a haze after heating at 600° C. to 700° C. for 15 minutes being 0.4% or less, and having a visible light reflectance measured from a side of the second transparent low refractive index layer based on JIS R 3106 being 1.0% or less, and
the second transparent low refractive index layer having an average hydrogen concentration $C_{av}$, of less than 10 atom %,
wherein the average hydrogen concentration $C_{av}$ obtained by forming a carbon film having a thickness of 5 nm on the second transparent low refractive index layer, measuring hydrogen concentrations at a depth range of 15 nm to 20 nm from a surface of the second transparent low refractive index layer at a portion where the carbon film is formed by a high resolution ERDA method, and averaging the obtained hydrogen concentrations to obtain the average hydrogen concentration $C_{av}$.

2. The antireflective glass sheet according to claim 1, wherein the first transparent high refractive index layer is composed of a titanium oxide doped with a zirconium oxide in a concentration of 27 to 50 mol %, and the first and second transparent low refractive index layers are mainly composed of a silicon oxide.

3. The antireflective glass sheet according to claim 2, wherein the first transparent high refractive index layer is composed of the titanium oxide doped with the zirconium oxide in a concentration of 30 to 40 mol %.

4. The antireflective glass sheet according to claim 2, wherein a material of the second transparent high refractive index layer is a same as a material of the first transparent high refractive index layer.

5. The antireflective glass sheet according to claim 2, wherein the second transparent high refractive index layer is composed of a titanium oxide doped with a zirconium oxide, in a dopant concentration larger than the first transparent high refractive index layer.

6. The antireflective glass sheet according to claim 1, having a color change ΔE between before and after heating at 600° C. to 700° C. for 15 minutes being 5 or less.

7. The antireflective glass sheet according to claim 6, having the color change ΔE between before and after heating at 600° C. to 700° C. for 15 minutes being 2 or less.

8. The antireflective glass sheet according to claim 1,
wherein the second transparent low refractive index layer is composed of a silicon oxide doped with a zirconium oxide in an amount of 5 to 50 mol %.

9. The antireflective glass sheet according to claim 8,
wherein the first transparent low refractive index layer is composed of the silicon oxide which is free of a zirconium oxide doped.

10. The antireflective glass sheet according to claim 8,
wherein the first transparent low refractive index layer is composed of a silicon oxide doped with a zirconium oxide in an amount of 5 to 50 mol %.

11. The antireflective glass sheet according to claim 1,
wherein the first transparent high refractive index layer, the first transparent low refractive index layer, the second transparent high refractive index layer, and the second transparent low refractive index layer provided on both surfaces of the glass sheet,
the antireflective glass sheet having a haze after heating at 600° C. to 700° C. for 15 minutes being 0.4% or less, and having a visible light reflectance measured from a side of the second transparent low refractive index layer based on JIS R 3106 being 2.0% or less.

12. The antireflective glass sheet according to claim 1,
wherein the first refractive index is 2.25 or more at a wavelength of 630 nm.

13. The antireflective glass sheet according to claim 1,
wherein the first transparent high refractive index layer has a thickness of from 5 nm to 40 nm.

14. The antireflective glass sheet according to claim 1,
wherein the second refractive index is from 1.4 to 1.8 at a wavelength of 630 nm.

15. The antireflective glass sheet according to claim 1,
wherein the first transparent low refractive index layer has a thickness of from 5 nm to 50 nm.

16. The antireflective glass sheet according to claim 1,
wherein the third refractive index is 2.25 or more at a wavelength of 630 nm.

17. The antireflective glass sheet according to claim 1,
wherein the second transparent high refractive index layer has a thickness of from 30 nm to 130 nm.

18. The antireflective glass sheet according to claim 1,
wherein the fourth refractive index is from 1.4 to 1.8 at a wavelength of 630 nm.

19. The antireflective glass sheet according to claim 1,
wherein the second transparent low refractive index layer has a thickness of from 65 nm to 120 nm.

* * * * *